United States Patent [19]

Kurz et al.

[11] 3,886,129
[45] May 27, 1975

[54] COPOLYMERS OF VINYL CHLORIDE AND 2-HYDROXYPROPYL ACRYLATE

[75] Inventors: Dieter Kurz; Herbert Kandler, both of Burghausen, Germany

[73] Assignee: Wacker-Chemie GmbH, Munich, Germany

[22] Filed: Feb. 8, 1974

[21] Appl. No.: 440,653

[30] Foreign Application Priority Data

Feb. 12, 1973  Germany............................ 2306808

[52] U.S. Cl. ............ 260/86.3; 117/124; 117/128.4; 117/138.8; 117/148; 117/161; 260/22 CB; 260/31.2 R; 260/32.8 R; 260/33.8 UA; 260/42.54; 260/836; 260/899
[51] Int. Cl. ............................................. C08f 15/26
[58] Field of Search .................................... 260/86.3

[56] References Cited

UNITED STATES PATENTS 3,803,111    4/1974    Munro et al. ...................... 260/86.3

*Primary Examiner*—Harry Wong, Jr.
*Attorney, Agent, or Firm*—Hammond & Littell

[57] ABSTRACT

Copolymers of vinyl chloride and 2-hydroxypropyl acrylate consisting of a copolymer with from 60 to 95% by weight of vinyl chloride monomer units and from 5 to 40% by weight of 2-hydroxypropyl acrylate monomer units, having a K-value of from 20 to 60 measured in cyclohexanone, as well as the method of producing the same by continuous addition of the monomer mix to an aqueous emulsion.

3 Claims, No Drawings

COPOLYMERS OF VINYL CHLORIDE AND 2-HYDROXYPROPYL ACRYLATE

THE PRIOR ART

For the varnish industry it is of great importance to have vinyl chloride copolymers available which are capable of being cross-linked and which are compatible with other varnish ingredients. Of particular advantage are copolymers which contain hydroxyl groups, since they can be cross-linked in various ways. Heretofore such copolymers were produced mostly in that vinyl chloride/vinyl acetate copolymers were subjected to partial saponification so that free hydroxyl groups were produced in the polymer. Such copolymers have the disadvantage, however, that they are never very heat stable. Stoving at temperatures above 150° C, for example, is not possible under practical conditions without visible thermal dissociation.

Another possibility known from the state of the art of producing vinyl chloride copolymers containing hydroxyl groups consists in polymerizing vinyl chloride with acrylic esters, where the alcohol of the ester carries a free hydroxyl group. These often described copolymers have the disadvantages, however, that they already crosslink to a great extent during the polymerization and are thus unsuitable as varnish ingredients.

OBJECTS OF THE INVENTION

An object of the invention is, therefore, to develop vinyl chloride copolymers containing hydroxyl groups, which are characterized by good thermal stability and good compatibility with other varnish ingredients.

Another object of the present invention is the development of copolymers of vinyl chloride and 2-hydroxypropyl acrylate consisting of a copolymer with from 60 to 95% by weight of vinyl chloride monomer units and from 5 to 40% by weight of 2-hydroxypropyl acrylate monomer units, having a K-value of from 20 to 60 measured in cyclohexanone.

A further object of the present invention is the development of a process for the preparation of the above copolymers comprising the steps of preparing an aqueous phase containing at least one water-soluble free radical polymerization catalyst and at least one oil-in-water emulsifier, continuously adding thereto a mixture of vinyl chloride and 2-hydroxypropyl acrylate in amounts sufficient to give a copolymerizate having from 60 to 95% by weight of vinyl chloride monomer units and from 5 to 40% by weight of 2-hydroxypropyl acrylate monomer units while stirring at a temperature of between 30°C and 80°C at a rate sufficient to maintain the autogeneous pressure of the vinyl chloride, and recovering said copolymer.

These and other objects of the invention will become more apparent as the description thereof proceeds.

DESCRIPTION OF THE INVENTION

The above objects were achieved by the present discovery of vinyl chloride copolymers characterized by a content of 60 to 95% by weight, preferably 75 to 90% by weight, of vinyl chloride and 5 to 40% by weight, preferably 10 to 25% by weight, of 2-hydroxypropyl acrylate with a K-value of 20 to 60, preferably 30 to 50, measured in cyclohexanone.

The polymers according to the invention are of particular importance for the production of coatings. They have good thermal stability and have good compatibility with other varnish ingredients. An essential requirement is good compatibility both with vinyl chloride copolymers and with alkyd resins.

More particularly, the invention relates to copolymers of vinyl chloride and 2-hydroxypropyl acrylate consisting of a copolymer with from 60 to 95% by weight of vinyl chloride monomer units and from 5 to 40% by weight of 2-hydroxypropyl acrylate monomer units, having a K-value of from 20 to 60 measured in cyclohexanone; as well as the process of preparing the copolymers comprising the steps of preparing an aqueous phase containing at least one water-soluble free radical polymerization catalyst and at least one oil-in-water emulsifier, continuously adding thereto a mixture of vinyl chloride and 2-hydroxypropyl acrylate in amounts sufficient to give a copolymerizate having from 60 to 95% by weight of vinyl chloride monomer units and from 5 to 40% by weight of 2-hydroxypropyl acrylate monomer units while stirring at a temperature of between 30°C and 80°C at a rate sufficient to maintain the autogeneous pressure of the vinyl chloride, and recovering said copolymer.

It was surprisingly found that 2-hydroxypropyl acrylate can be polymerized with vinyl chloride without marked cross-linking over the free hydroxyl groups. It is thus possible to produce copolymers with the desired K-value range (also lower K-values). Low K-values are desired in order to be able to produce varnishes with higher solid contents and having low viscosities.

Furthermore, the copolymers according to the invention show very good compatibilities with other varnish ingredients, particularly the compatibility with vinyl chloride copolymers is very good, compared to the presently used partly saponified vinyl chloride/vinyl acetate copolymers. In addition, the compatibility with alkyd resins is very good.

Of particular advantage is the fact that the new copolymers show a particularly good thermal stability. Due to this property it is possible to subject varnishes prepared from the products of the invention to temperatures over 150°C and thus to achieve rapid stoving without discoloration of the varnish. In addition, the stoved varnishes show excellent gloss and outstanding mechanical properties.

The cross-linkability of the resins according to the invention is manifold and very good. For example, they can be cross-linked by polyisocyanates (in amounts of 40 to 60% by weight, based on the resin and cross-linking agent), urea resins, phenol resins (in amounts of 10 to 40% by weight, based on the resin and cross-linked agent), melamine resins (in amounts of 10 to 25% by weight based on the resin and cross-linking agent), tetracarboxylic acid anhydrides, epoxide compounds and mixtures thereof, frequently in amounts of 1 to 90% by weight based on the mixture. Temperatures of 20° to 220°C are generally used in cross-linking. The varnish surfaces obtained are characterized by very good resistance to chemical agents, for example, water, oils, fats and solvents, and to mechanical stress.

The solubility of the copolymers in the conventional varnish solvents for vinyl chloride copolymers is likewise very good. Examples of such solvents are esters and ketones which can be modified with aromatic compounds, benzine or with solvents containing hydroxyl groups. These varnish solvents are, for example, acetone, methylethyl ketone, methylisobutyl ketone, cyclohexanone, methoxy-hexanone, methylamyl ketone, methyl acetate, ethyl acetate and butyl acetate, as well as methylene chloride and mixtures thereof.

The applicability of the copolymers is very manifold both in the cross-linked and in the uncross-linked state. Of particular interest is the use as a varnish ingredient, also in mixture with other resins and optionally under addition of inorganic pigments, such as chrome yellow, green chromium oxides, molybdenum orange and red, iron oxides, carbon black, titanium oxide and of organic pigments, such as phthalocyanins, and of fillers, like highly dispersed silicic acids, alumina silicates, bentonites, kaolins, talc, dolomite, heavy spar, blanc fixe and mica. A typical application is the use for the production of coating varnishes for metal surfaces, where good corrosion protection and excellent mechanical deformability are required, such as metal sheeting lacquers, packaging laquers, laquers for containers and pipes. The following coatable metals are mentioned by way of example: iron, zinc, aluminum, copper, brass, tin and cadmium.

An advantageous composition for metal coating varnishes consists of:

15 to 35% by weight of binder which contains 40 to 90% by weight of the copolymer of the invention and 10 to 60% by weight of cross-linking agents, and 65 to 85% by weight of solvents, as well if necessary, 10 to 35% by weight of volume of pigments, based on the sum of binders and pigment.

Varnishes can also contain other lacquer ingredients, for example, alkyd resins or vinyl chloride/vinyl acetate copolymers. Other surfaces can also be coated, like wood, glass or plastics.

In addition to the use as a varnish ingredient, these copolymers can be used in general as binders for coatings. For example, the copolymerizate according to the invention can be used as a binder for magnetic materials, as they are employed in the production of recording tapes.

Another application is the use as an adhesion intermediary, particularly on plastics. For example, these copolymers can be used as an intermediate layer in the metallization of plastics.

They are also suitable for the production of solvent adhesives and lining adhesives, for example, for cementing metals with PVC foils under the action of heat and pressure.

The production of the polymers can be effected according to all known polymerization methods, such as block, solution, suspension and emulsion polymerization, where free radical polymerization catalysts are employed. The copolymers are preferably produced by introducing the vinyl chloride and the 2-hydroxypropyl acrylate continuously under stirring into an aqueous phase which contains watersoluble free radical polymerization catalysts and emulsifiers, and polymerizing the monomer-water emulsion formed continuously at 30°C to 80°C under the autogeneous pressure of the vinyl chloride.

The commonly employed anionic, cationic and amphoteric emulsifiers can be utilized, mostly in amounts of from 0.2 to 3% by weight, based on the weight of the monomers. Such emulsifiers are, for example, fatty acid soap, alkyl sulfates, alkane sulfonates, alkylbenzene sulfonates, alkylnaphthalene sulfonates, sulfosuccinic acid esters, phosphoric acid partial esters, quaternary alkyl ammonium salts, partial fatty acid esters of polyhydric alcohols, such as sorbitol monopalmitate, fatty alcohol sulfuric acid esters, partly etherified polyalcohols, condensation products of alkylene oxides with higher fatty acids or higher fatty alcohols or phenols and mixtures thereof. In each instance a hydrophobic chain of at least 8 carbon atoms is present.

The customary water-soluble free radical formers can be used, frequently in amounts of from 0.1 to 1% by weight based on the monomers, for example, the salts of peroxysulfuric acid, such as ammonium persulfate, potassium persulfate, or sodium persulfate, hydrogen peroxide, tert.- butyl hydroperoxide. Reducing agents, generally in amounts of from 0.01 to 0.5% by weight based on the monomers, can also be added. Examples of such reducing agents are the alkali metal thiosulfates, rongalite, dithionites, sulfites, as well as mixture thereof. If necessary, copper salts and iron salts can be used as promoters.

The monomer mixture can be charged in small amounts in the aqueous phase, the major part is added continuously corresponding to the consumption during the polymerization. The consumption can be determined with reference to the pressure in the autoclave. The continuous addition is so effected that the pressure does not drop at a constant temperature. The pressure is mostly between 5 and 10 atmospheres gauge.

The copolymers are obtained from the aqueous emulsion in known manner by precipitation, for example with metal salts such as sodium chloride.

The following examples are illustrative of the invention without being limitative.

EXAMPLE 1

1 gm of $K_2S_2O_8$ was dissolved under stirring in 500 ml of fully deionized water in a 1 liter laboratory autoclave. Subsequently the air was removed from the closed autoclave in known manner. After heating to 60°C, 425 gm of a vinyl chloride/acrylate mixture consisting of 357 gm of vinyl chloride, 63 gm of 2-hydroxypropyl acrylate and 5 gm of "Aerosol OT" (as an emulsifier) were dosed into the autoclave continuously at a rate corresponding to the consumption whereby a constant pressure of 6.5 atmospheres at 60°C was maintained. Subsquently, the polymerization was continued to an end pressure of 2.5 atmospheres.

The emulsion thus obtained was coagulated in known manner by ionic addition (salt addition). After filtering, washing and drying, a polymerizate in powder form was obtained with a polymer content of 14% of 2-hydroxypropyl acrylate (determined according to Verley et al., Berichte 34, 3354, 1901) and a K-value of 48.

EXAMPLE 2

Example 1 was repeated, but modified by adding 425 gm of a vinyl chloride/acrylate mixture, consisting of 336 gm of vinyl chloride, 84 gm of 2-hydroxypropyl acrylate and 5 gm of "Aerosol OT" at a pressure of 6.5 atmospheres.

The polymerizate had a K-value of 45.5 and a polymer content of 17.7% of 2-hydroxypropyl acrylate.

EXAMPLE 3

Example 1 was repeated, but modified by adding to the aqueous phase 3.8 gm of dichlorethylene as a molecular weight according to the interlineation. In addition the polymerization was carried out at 70°C and 8 atmospheres.

The product had a K-value of 36.6 and a polymer content of 14% of 2-hydroxypropyl acrylate.

The products of each example were easily soluble in conventional solvents, such as acetone, methylethyl ketone, methylisobutyl ketone, cyclohexanone, methoxyhexanone, ethylamyl ketone, methyl acetate, butyl acetate or methylene chloride.

A comparison of the products according to Examples 1, 2 and 3 was made with a conventionally produced vinyl chloride mixed polymerizate (90% by weight of vinyl chloride, 5% by weight of vinyl acetate, 5% by weight of vinyl alcohol), where the hydroxyl groups were introduced by saponification of some of the acetate radicals. The results are given in the table.

TABLE

| Examples | 1 | 2 | 3 | Comparison Product |
|---|---|---|---|---|
| Solubility in ethyl acetate | 1 | 1 | 1 | 1 |
| Compatibility with alkyd resins copolymerizate of vinyl chloride and vinyl acetate | 1 | 1.5 | 1.5 | 1.1 |
| | 1 | 1 | 1 | 1 |
| Blue remission in % (after 150°C/30') | 74.9 | 77.6 | 75.2 | 49.4 |
| Soluble portion % (after 120°C/60') | 11.8 | 6.7 | 10.4 | 5.7 |

Explanation of Tests

| | |
|---|---|
| Solubility: | 1 indicates clear free-flowing solutions |
| Compatability: | 1 indicates compatibility in any mixing ratio to 4 indicating no compatibility. |
| Blue remission: | The blue remission test was used as a measure for the thermal stability. |

Varnishes were produced according to the following formula:

| | Parts by Weight |
|---|---|
| Vinyl resin | 100 |
| Titanium dioxide (rutile) | 65 |
| Xylene | 150 |
| Butyl acetate 99% | 90 |
| Cyclohexanone | 80 |

After stoving at 150°C (30 minutes) the blue remission value was measured with a reflection photometer.

While the remission of the unheated samples is 85.5%, the value decreases with increasing yellowing on heating.

As can be determined the blue remission of the products of Examples 1, 2, and 3 according to the invention was much higher than that of the comparison sample, therefore, the thermal stability was much higher.

Soluble portions: As a measure of the cross-linking after 60 minutes at 120°C the portion soluble in ethyl acetate of the varnish films was determined.

The measurements were made on a colorless metal varnish of the following composition:

| | Parts by Weight |
|---|---|
| Vinyl resin | 17 |
| Melamine resin ("Maprenal NPX") 55% solution, Cassella) | 5.5 |
| Ethyl acetate | 77.5 |

The degree of cross-linking of the products of Examples 1, 2, 3 is equivalent with that of the vinyl chloride copolymer.

EXAMPLE 4 (Comparison)

Example 1 was repeated, but 2-hydroxyethyl acrylate was used instead of 2-hydroxypropyl acrylate. A product with a K-value of about 75 was obtained. The polymer was insoluble in the conventional solvents, which indicates extensive cross-linking during polymerization.

EXAMPLE 5 (Comparison)

Example 1 was repeated by using 4-hydroxybutyl acrylate. The product had a K-value of about 70 and was insoluble in conventional solvents. Here again extensive cross-linking during polymerization is indicated.

The preceeding specific embodiments are illustrative of the practice of the invention. It is to be understood however, that other expedients known to those skilled in the art or disclosed herein may be employed without departing from the spirit of the invention or the scope of the appended claims.

We claim:

1. Copolymers of vinyl chloride and 2-hydroxypropyl acrylate consisting of a copolymer with from 60 to 95% by weight of vinyl chloride monomer units and from 5 to 40% by weight of 2-hydroxypropyl acrylate monomer units, having a K-value of from 20 to 60 measured in cyclohexanone produced by the process comprising the steps of preparing an aqueous phase containing at least one water-soluble free radical polymerization catalyst and at least one oil-in-water emulsifier, continuously adding thereto a mixture of vinyl chloride and 2-hydroxypropyl acrylate in amounts sufficient to give a copolymerizate having from 60 to 95% by weight of vinyl chloride monomer units and from 5 to 40% by weight of 2-hydroxypropyl acrylate monomer units while stirring at a temperature of between 30°C and 80°C at a rate sufficient to maintain the autogeneous pressure of the vinyl chloride, and recovering said copolymer.

2. The copolymer of claim 1 having a content of 75 to 90% by weight of vinyl chloride monomer units and 10 to 25% by weight of 2-hydroxypropyl acrylate monomer units and having a K-value of from 30 to 50.

3. A process for the production of a copolymer of vinyl chloride and 2-hydroxypropyl acrylate comprising the steps of preparing an aqueous phase containing at least one water-soluble free radical polymerization catalyst and at least one oil-in-water emulsifier, continuously adding thereto a mixture of vinyl chloride and 2-hydroxypropyl acrylate in amounts sufficient to give a copolymerizate having from 60 to 95% by weight of vinyl chloride monomer units and from 5 to 40% by weight of 2-hydroxypropyl acrylate monomer units while stirring at a temperature of between 30°C and 80°C at a rate sufficient to maintain the autogeneous pressure of the vinyl chloride, and recovering said copolymer.

* * * * *